United States Patent
Goben

[11] 3,908,951
[45] Sept. 30, 1975

[54] SHOCK ATTENUATING STRUCTURE

[75] Inventor: Kenneth W. Goben, Taylorsville, N.C.

[73] Assignee: The United States of America as represented by the Secretary of the Navy, Washington, D.C.

[22] Filed: Dec. 20, 1973

[21] Appl. No.: 426,783

[52] U.S. Cl. .............................. 248/358 R; 188/1 C
[51] Int. Cl.² ............................................ F16F 7/12
[58] Field of Search ............. 248/358 R, 15, 18, 20; 188/1 C

[56] References Cited
UNITED STATES PATENTS

| | | | |
|---|---|---|---|
| 2,728,479 | 12/1955 | Wheeler | 188/1 C |
| 3,010,540 | 11/1961 | Dahlen | 188/1 C |
| 3,198,288 | 8/1965 | Presunka | 188/1 C |
| 3,506,295 | 4/1970 | Yancey | 188/1 C X |
| 3,586,131 | 6/1971 | Mire | 188/1 C |
| 3,624,764 | 11/1971 | Goben | 188/1 C |
| 3,703,999 | 11/1972 | Forys et al. | 248/13 X |
| 3,717,223 | 2/1973 | Alfes | 188/1 C |
| 3,752,523 | 8/1973 | Bierbraver | 188/1 C X |
| 3,806,180 | 4/1974 | Patterson | 188/1 C X |
| 3,809,420 | 5/1974 | Weller | 188/1 C X |

Primary Examiner—J. Franklin Foss
Attorney, Agent, or Firm—R. S. Sciascia; Q. E. Hodges

[57] ABSTRACT

A shock attenuating support structure for equipment comprising metal material which exhibits "elastic-plastic" properties. For all operational and low intensity shock loads, the structure acts in a rigid (or elastic) manner and transmits these forces without change to the structure or its mounted equipment. For high shock loads which would normally be damaging to the equipment, the structure deforms plastically and absorbs the excess acceleration and energy.

1 Claim, 8 Drawing Figures

CYLINDRICAL TUBE

DOUBLE C TUBE

DIAMOND FRAME

DIAMOND TUBE

SHOCK ATTENUATING STRUCTURE

The invention described herein may be manufactured and used by or for the Government of the United States of America for Governmental purposes without the payment of any royalties thereon or therefore.

BACKGROUND OF THE INVENTION

Underwater explosions generate high pressure shock waves which are capable of damaging marine and naval ships. When a pressure wave strikes the side of a ship, energy is transferred to the ship hull which, in turn, transmits the transient accelerations and displacements to the surrounding equipment. The resulting damage is a function of the strength of the equipment and the ability of the foundation structures to protect the equipment.

A shipboard foundation is a transition piece which must conform to the equipment mounting base and the configuration of the ship's structure. It serves to transmit the operational loads of the equipment to the hull, but it also transmits shock loads for underwater explosions to the equipment. The general problem in foundation design is to satisfy both the conflicting requirements of vibration and shock. The vibration qualities of a system usually depend on the stiffness of the foundation, whereas the shock survival of an average item of equipment depends on the flexibility of the foundation. Stronger items do not require as much foundation flexibility as items of lesser strength. Elastic foundations for moderate strength equipment designed for severe to near-lethal attack must have such large elastic deflections that their flimsy nature makes them potential noise sources.

If equipment is expected to survive shock design goals that approach the ultimate strength of the hull, the foundation has to attenuate hull deformations and transient forces to levels which the equipment can tolerate.

SUMMARY OF THE INVENTION

The "elastic-plastic" structures of the present invention provide an immediate solution to the problem of shipboard mounting of equipment. The devices described herein remain substantially rigid for shock loads which would not be damaging to the equipment but deform, i.e., are plastic, for shock loads which would be damaging to the equipment.

OBJECTS OF THE INVENTION

The object of this invention is to provide a shock attenuating support structure for a device which support structure may easily be designed to have a sufficiently high vibration frequency to permit normal use of the device.

Another object of this invention is to provide a foundation support structure which remains elastic for all shock loads resulting from operational duties but which yields plastically during severe shock attacks and thus prevents the shock loads from disabling the equipment.

Other objects, advantages, and novel features of the invention will become apparent from the following detailed description of the invention when considered in conjunction with the accompanying drawings wherein:

DESCRIPTION OF THE PREFERRED EMBODIMENTS

Figure 1:
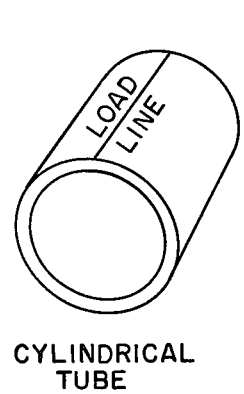
FIGS. 1 and 2 are prior art spring type shock attenuating support structures.
Figure 2:
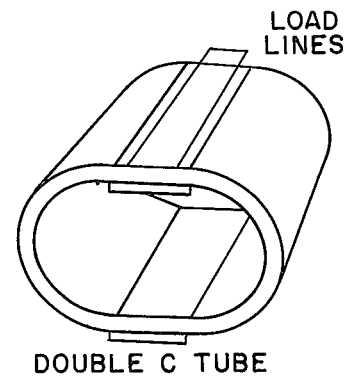

FIG. 1 shows a prior art elastic-plastic spring consisting of a cylindrical tube wherein the device is mounted along the load line shown. FIG. 2 shows another prior art elastic-plastic spring support which consists of two half cylinders joined by straight portions (double C-mounts). The problem with the prior art structures shown in FIGS. 1 and 2 is that they cannot pragmatically be designed to have a sufficiently high vibration frequency to permit normal usage of the equipment mounted along the load lines. Typically, the cylindrically shaped springs vibrate at less than 35 cps. Theoretically, cylindrical shock mounts could be designed with a much higher vibration frequency but this would require a structure of such mass, size, and weight, that its use would be prohibitive.

Figure 3:
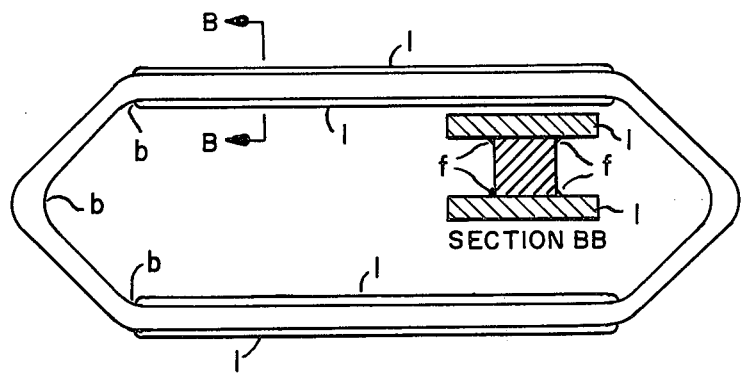
FIGS. 3, 4, and 5 are three embodiments of the shock attenuating support structure as disclosed herein.
Figure 7:
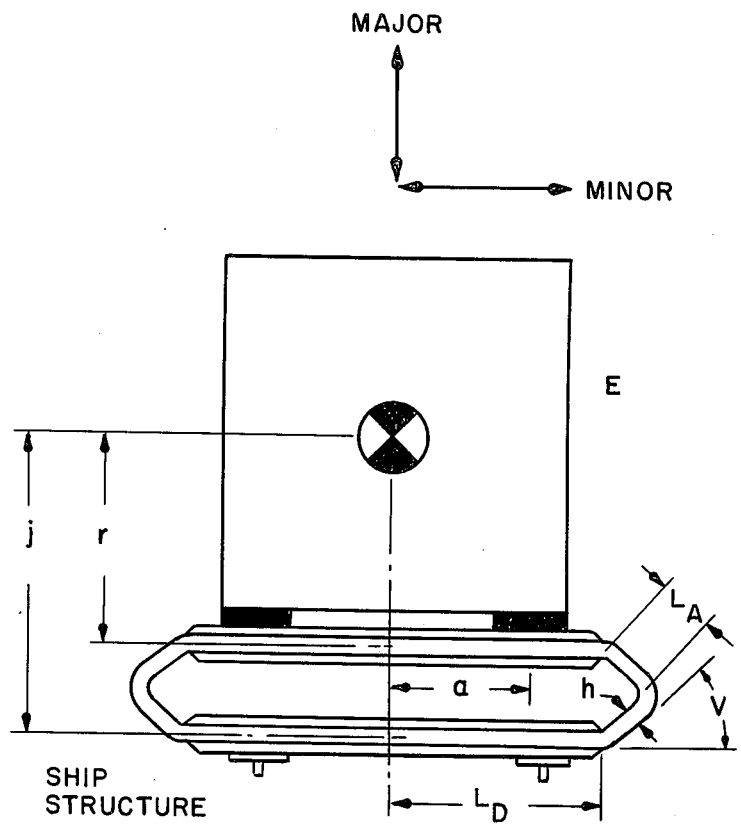
FIG. 7 is a front view of the structure shown in FIG. 3 further including a device mounted thereon.

FIG. 3 shows an akimbo frame according to the present invention. Akimbo is defined herein as a six sided figure including parallel top and bottom members of equal length and four side members of equal lengths. The left hand side members join the left ends of the top and bottom members and the right hand side members join the right ends of the top and bottom members. The top left side member and the lower right side member are parallel and the lower left side member and the upper right side member are parallel. By definition, moreover, akimbo refers to a unitary structure, e.g., a structure containing no mechanical hinges. The structure is preferably formed by bending a straight metallic rod at six locations and welding the free ends. The bends, b, should generally have a minimum inner radius greater than the thickness of the material forming the structure. Since the frame is generally welded, the location of the weld has to be considered. To prevent weld failures in any structure, the weld should not be made in an area of highest stress. In the akimbo frame, the highest stressed locations are in the bends. The lowest stressed locations are between the bends in the side members, and the welding of the unitary metallic material should be performed at these locations. To minimize the work of the welder, the reinforcing bars 1 for the top and bottom members should be chosen to make them amenable to all around fillet welding. Since the frame is designed to store and absorb energy, no holes should be cut or drilled into it. Securements to the foundation frames can be accomplished by welding. FIG. 7 shows a device E mounted on top of an akimbo frame; $L_A$ represents the beam length of one of the right hand members of the frame, $h$ represents the width of the square bar used for the members, $L_D$ represents one half of the length of the top or bottom member of the akimbo frame, $v$ represents the akimbo angle, $j$ represents the distance from the bottom member center to the center of gravity of the device E, $r$ represents the distance from the center of the top member to the center of gravity of the device E, and $a$ represents one half the distance between the support points of the external load E mounted on the top member. By varying the parameters $L_A$, h, $L_D$, v, j, r, and a, by obtaining the weight, strength, and geometric mounting data for the device to be mounted, and by using known design formulas, an akimbo frame may be constructed with a particular elastic-plastic characteristic, and a particular vibration frequency range.

An important rule in frame design is to choose the component so that the locations of maximum stress are at the bends of the legs. The top and bottom members are designed to restrict frame yielding to the bends. The rationale for designing in this manner is to obtain a structure which can sustain significant plastic deformation without appreciably affecting the mounting surfaces of the device.

Figure 6:
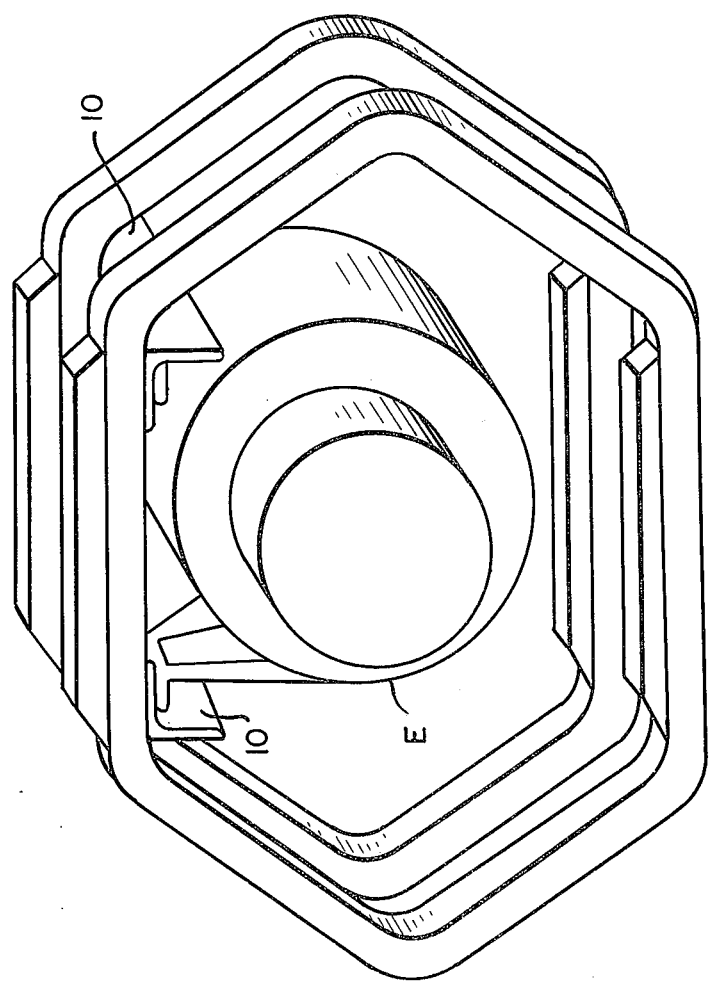
FIG. 6 is a support structure arrangement utilizing two of the shapes shown in FIG. 3.

FIG. 6 shows an under-slung design wherein the device E is mounted on brackets 10 which are secured to two akimbo frames. Considerable space savings can thus be accomplish by mounting the device within the area enclosed by the frames.

Figure 4:
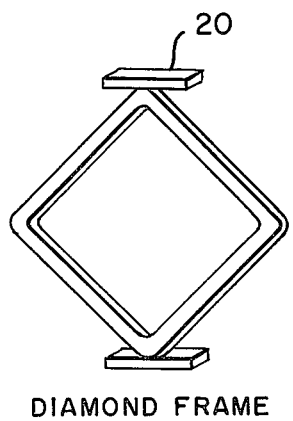
Figure 5:
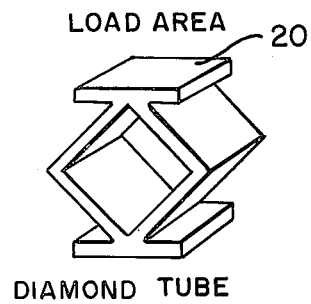
Figure 8:
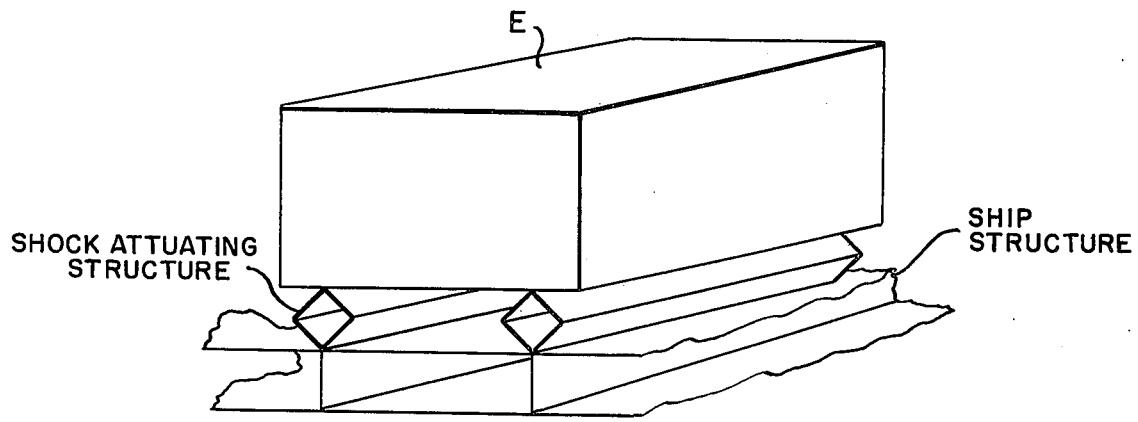
FIG. 8 shows two diamond tube support structures as shown in FIG. 5 with a device mounted thereon.

FIGS. 4 and 5 show a diamond frame and a diamond tube respectively, wherein mounting platforms 20 are welded to the metallic frame members at one of the vertices thereof. The embodiments of FIGS. 4 and 5 may also be designed to yield a desired plastic-elastic characteristic and vibration frequency just as the akimbo frame described above. FIG. 8 shows how two diamond tube support structures as shown in FIG. 5 may be used to support a device E. Instead of using the diamond tube along the entire length of the device E, four short diamond shaped tubular members could be used at four locations underneath the device E, or a diamond frame as shown in FIG. 4 or a plurality of diamond frames may be used at strategic locations.

The akimbo frame spring, the diamond frame, and the diamond tube are versatile supports for mounting equipment since they can be designed either to support the equipment either completely elastically or "elastic-plastically" and, thus, prevent a shock load from damaging the supported item. Furthermore, the vibratory characteristic and appearance of the support structure are not significantly altered by minor plastic deformations.

The basic design equations are simplified when used with square metallic material but the design is not limited to this geometry of cross-section. Moreover, the shock mounts disclosed herein could conceivably be used as air drop palets, for automobile bumpers, or in any other place where an energy absorbing structure is needed.

Obviously, many modifications and variations of the present invention are possible in the light of the above teachings. It is, therefore, to be understood that within the scope of the appended claims the invention may be practiced otherwise than as specifically described.

What is claimed is:

1. An akimbo shaped shock attenuating support structure for a device mounted in the interior area of said support structure comprising a unitary member having a rectangular cross section and reinforcing means for preventing the top member of said akimbo shaped support from deforming during shock loads which would be damaging to said device, said support structure being substantially rigid for shock loads below a predetermined magnitude and being plastic for shock loads above said predetermined magnitude.

* * * * *